CHARLES KRUTZ.
Improvement in Coffee-Grinders.
No. 127,249.  Patented May 28, 1872.
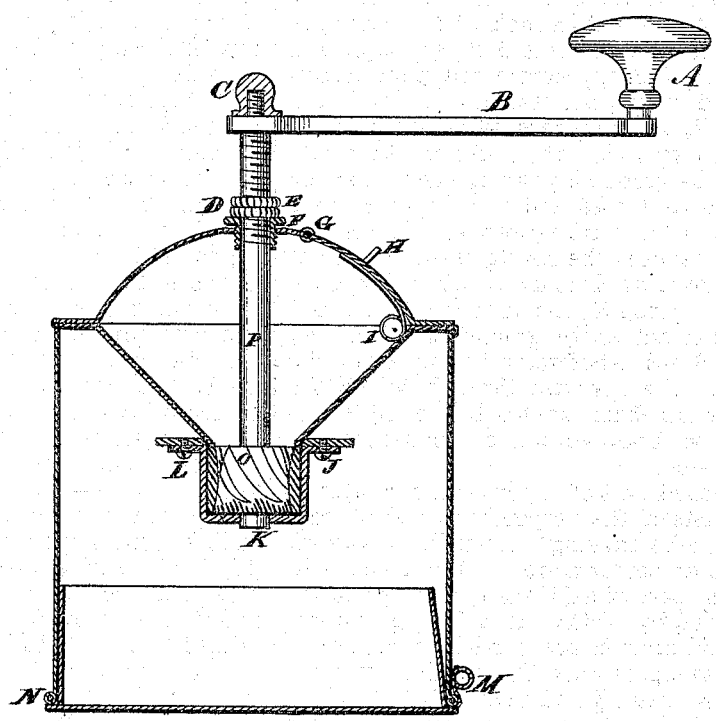
Witnesses:
R H Whittlesey
John Williams
Inventor:
Charles Krutz
by
S. M. Pool

UNITED STATES PATENT OFFICE.

CHARLES KRUTZ, OF ADRIAN, MICHIGAN.

IMPROVEMENT IN COFFEE-GRINDERS.

Specification forming part of Letters Patent No. 127,249, dated May 28, 1872.

SPECIFICATION.

I, CHARLES KRUTZ, of the city of Adrian, Lenawee county, Michigan, have invented a new and Improved Coffee-Grinder, of which the following is a specification:

The first part of my invention relates to and consists of a Russia sheet-iron box five inches square, with a raised or oval top, with a box in the bottom about an inch and a quarter in depth, so constructed as to shut perfectly tight. That part of the top, represented in the accompanying drawing, between the spring I and the joint G, opens upward by pressing on the spring I, into which the coffee or other substance to be ground is poured, when it may be shut tight as before and remain thus while grinding. That part represented in the said drawing between the spring M and the joint N, opens downward from the bottom by pressing on the spring M, and thus empties the coffee or other substance ground, when it may again be closed as before, to remain thus while grinding. The aperture through which the perpendicular shaft extends downward is protected by the brass screw F, and thus rendered more durable.

The second part of my invention relates to and consists of the perpendicular shaft represented in the drawing between K and C, with the peculiar conformation of the grooves in the larger part of said shaft, near the lower end thereof, by which the grinding is done, which said grooves are partially represented in the drawing, marked O, with the lower end of the shaft resting and revolving in the iron supporter at K, where the substance ground is discharged into the box, held in place and adjusted by the screws E and D. The crank A B, with which said shaft is turned, is screwed on the upper end of said shaft, and held to its place by the brass screw C.

A is the knob, and B the handle, constituting the crank with which to turn the shaft by which the grinding is done. C is a brass screw to hold the crank to its place. D is a screw with which to set the shaft so as to grind fine or coarse. E is a screw which holds the screw D in place. F is a screw to protect the aperture in the top of the box, through which the perpendicular shaft extends downward, for said shaft to run in to prevent friction, &c. G is a joint in the top of the box, so that it may be opened. H is a knob with which to open and close said top or lid. I is a spring for holding the lid in place. J is a screw which, together with the screw L, fastens the iron supporter to the hopper. K is the lower end of the shaft. M is the spring, to be pressed upon when emptying the substance ground and returning the small box to its place. N is a joint, so constructed that the small box in the bottom may be opened downward and its contents emptied. O represents to some extent the grooves in the shaft.

What I claim, and desire to secure by Letters Patent, is—

The improved coffee-grinder herein described, consisting of the sheet-metal box, the lid, joints, springs, and screws, the pivoted receiving-box, the hopper, the grooved shaft, and the supporter, all constructed and arranged to operate substantially as specified.

Witness my hand and seal this 18th day of April, A. D. 1872.

CHARLES KRUTZ. [L. S.]

In presence of—
GEO. L. BACHMAN,
C. B. BACKUS.